United States Patent
Huang

(10) Patent No.: US 7,471,717 B2
(45) Date of Patent: Dec. 30, 2008

(54) APPARATUS AND METHOD FOR ACQUIRING SPREAD-SPECTRUM SIGNALS

(76) Inventor: Yi Ping Huang, 4F-3, No. 50, Dasyue Rd., Hsinchu City (TW) 300

(*) Notice: Subject to any disclaimer, the term of this patent is extended or adjusted under 35 U.S.C. 154(b) by 738 days.

(21) Appl. No.: 10/847,244

(22) Filed: May 17, 2004

(65) Prior Publication Data

US 2005/0254560 A1 Nov. 17, 2005

(51) Int. Cl.
*H04B 1/00* (2006.01)
(52) U.S. Cl. .................. 375/150; 375/130; 375/140; 375/147; 370/320; 370/335; 370/342; 370/441; 370/479
(58) Field of Classification Search ............. 375/150, 375/130, 140, 147
See application file for complete search history.

(56) References Cited

U.S. PATENT DOCUMENTS

| | | | |
|---|---|---|---|
| 5,897,605 A | 4/1999 | Kohli et al. | |
| 5,999,561 A * | 12/1999 | Naden et al. | 375/142 |
| 6,085,151 A * | 7/2000 | Farmer et al. | 701/301 |
| 6,151,353 A * | 11/2000 | Harrison et al. | 375/136 |
| 6,546,256 B1 * | 4/2003 | Maloney et al. | 455/404.2 |
| 6,577,271 B1 * | 6/2003 | Gronemeyer | 342/378 |
| 6,606,346 B2 | 8/2003 | Abraham et al. | |
| 6,642,884 B2 * | 11/2003 | Bryant et al. | 342/357.1 |
| 6,724,811 B2 * | 4/2004 | Kohli et al. | 375/150 |
| 6,804,290 B1 * | 10/2004 | King et al. | 375/142 |
| 6,888,879 B1 * | 5/2005 | Lennen | 375/149 |
| 6,930,634 B2 * | 8/2005 | Peng et al. | 342/357.01 |
| 6,961,660 B2 * | 11/2005 | Underbrink et al. | 701/213 |
| 6,965,631 B2 * | 11/2005 | Shakeri et al. | 375/142 |
| 7,003,021 B2 * | 2/2006 | Gilhousen et al. | 375/150 |
| 7,184,461 B2 * | 2/2007 | Mehrnia et al. | 375/147 |
| 7,224,721 B2 * | 5/2007 | Betz et al. | 375/152 |
| 2003/0223477 A1 * | 12/2003 | Loomis et al. | 375/147 |
| 2004/0136446 A1 * | 7/2004 | Kohli et al. | 375/150 |
| 2005/0163201 A1 * | 7/2005 | Krasner | 375/150 |

* cited by examiner

*Primary Examiner*—Shuwang Liu
*Assistant Examiner*—Kenneth Lam
(74) *Attorney, Agent, or Firm*—Egbert Law Offices PLLC

(57) ABSTRACT

An apparatus for acquiring spread-spectrum signals includes a mixer for generating an in-phase signal and a quadrature signal from the spread-spectrum signal, a decimator for subsampling the in-phase signal and the quadrature signal, a correlation engine for producing an in-phase correlation between the subsampled in-phase signal and a PN code and producing a quadrature correlation between the subsampled quadrature signal and the PN code, a first coherent integrator for accumulating a plurality of in-phase correlations to produce an in-phase coherent integration, a second coherent integrator for accumulating a plurality of quadrature correlations to produce a quadrature coherent integration, an incoherent integrator for accumulating the in-phase coherent integrations and the quadrature coherent integrations to produce an incoherent integration, and a signal detector for checking the presence of the spread-spectrum signal based on the incoherent integration.

16 Claims, 15 Drawing Sheets

C/A code LUT ROM

| | bit7 | bit6 | ... | bit1 | bit0 | |
|---|---|---|---|---|---|---|
| PRN1 C/A code | c7 | c6 | ... | c1 | c0 | 000h |
| | c15 | c14 | ... | c9 | c8 | 001h |
| | c47 | c46 | ... | c33 | c32 | 002h |
| | | | ... | | | |
| | c1015 | c1014 | ... | c1009 | c1008 | 07Eh |
| | x | c1022 | ... | c1017 | c1016 | 07Fh |
| PRN2 C/A code | c'7 | c'6 | ... | c'1 | c'0 | 080h |
| | c'15 | c'14 | ... | c'9 | c'8 | 081h |
| | c'47 | c'46 | ... | c'33 | c'32 | 082h |
| | | | ... | | | |
| | c'1015 | c'1014 | ... | c'1009 | c'1008 | 0FEh |
| | x | c'1022 | ... | c'1017 | c'1016 | 0FFh |
| | | | ... | | | |
| PRN32 C/A code | c"7 | c"6 | ... | c"1 | c"0 | F80h |
| | c"15 | c"14 | ... | c"9 | c"8 | F81h |
| | c"47 | c"46 | ... | c"33 | c"32 | F82h |
| | | | ... | | | |
| | c"1015 | c"1014 | ... | c"1009 | c"1008 | FFEh |
| | x | c"1022 | ... | c"1017 | c"1016 | FFFh |

FIG. 6

RAM buffer contents t=0~127

| d15 | d14 | d13 | d12 | ... | d1 | d0 | 00h |
|---|---|---|---|---|---|---|---|
| d31 | d30 | d29 | d28 | ... | d17 | d16 | 01h |
| d47 | d46 | d45 | d44 | ... | d33 | d32 | 02h |
|  |  |  |  | ... |  |  |  |
| d2031 | d2030 | d2029 | d2028 | ... | d2017 | d2016 | 7Eh |
| d2047 | d2046 | d2045 | d2044 | ... | d2033 | d2032 | 7Fh | t=128~255

| d2063 | d2062 | d2061 | d2060 | ... | d2049 | d2048 | 00h |
|---|---|---|---|---|---|---|---|
| d31 | d30 | d29 | d28 | ... | d17 | d16 | 01h |
| d47 | d46 | d45 | d44 | ... | d33 | d32 | 02h |
|  |  |  |  | ... |  |  |  |
| d2031 | d2030 | d2029 | d2028 | ... | d2017 | d2016 | 7Eh |
| d2047 | d2046 | d2045 | d2044 | ... | d2033 | d2032 | 7Fh | t=256~383

| d2063 | d2062 | d2061 | d2060 | ... | d2049 | d2048 | 00h |
|---|---|---|---|---|---|---|---|
| d2079 | d2078 | d2077 | d2076 | ... | d2065 | d2064 | 01h |
| d47 | d46 | d45 | d44 | ... | d33 | d32 | 02h |
|  |  |  |  | ... |  |  |  |
| d2031 | d2030 | d2029 | d2028 | ... | d2017 | d2016 | 7Eh |
| d2047 | d2046 | d2045 | d2044 | ... | d2033 | d2032 | 7Fh |

FIG. 7

| IReg1 | | | | | IReg0 | | | | |
|---|---|---|---|---|---|---|---|---|---|
| d31 | d30 | d29 | ... | d18 | d17 | d16 | d15 | d14 | d13 | ... | d2 | d1 | d0 |

Acc0,0 = d15*c7 + d14*c7 + d13*c6 + d12*c6 + ... + d3*c1 + d2*c1 + d1*c0 + d0*c0
Acc1,0 = d16*c7 + d15*c7 + d14*c6 + d13*c6 + ... + d4*c1 + d3*c1 + d2*c0 + d1*c0
t=128 ...
Acc14,0 = d29*c7 + d28*c7 + d27*c6 + d26*c6 + ... + d17*c1 + d16*c1 + d15*c0 + d14*c0
Acc15,0 = d30*c7 + d29*c7 + d28*c6 + d27*c6 + ... + d18*c1 + d17*c1 + d16*c0 + d15*c0

| IReg1 | | | | | IReg0 | | | | |
|---|---|---|---|---|---|---|---|---|---|
| d47 | d46 | d45 | ... | d34 | d33 | d32 | d31 | d30 | d29 | ... | d18 | d17 | d16 |

Acc0,1 = Acc0,0 + d31*c15 + d30*c15 + d29*c14 + d28*c14 + ... + d19*c9 + d18*c9 + d17*c8 + d16*c8
Acc1,1 = Acc1,0 + d32*c15 + d31*c15 + d30*c14 + d29*c14 + ... + d20*c9 + d19*c9 + d18*c8 + d17*c8
t=129 ...
Acc14,1 = Acc14,0 + d45*c15 + d44*c15 + d43*c14 + d42*c14 + ... + d33*c9 + d32*c9 + d31*c8 + d30*c8
Acc15,1 = Acc15,0 + d46*c15 + d45*c15 + d44*c14 + d43*c14 + ... + d34*c9 + d33*c9 + d32*c8 + d31*c8

FIG. 8(a)

| IReg1 | | ... | | | IReg0 | | | |
|---|---|---|---|---|---|---|---|---|
| d2047 | d2046 | d2045 | ... | d2034 | d2033 | d2032 | d2031 | d2030 | d2029 | ... | d2018 | d2017 | d2016 |

Acc0,126 = Acc0,125 + d2031*c1015 + d2030*c1015 + d2029*c1014 + d2028*c1014 + ... + d2019*c1009 + d2018*c1009 + d2017*c1008 + d2016*c1008

Acc1,126 = Acc1,125 + d2032*c1015 + d2031*c1015 + d2030*c1014 + d2029*c1014 + ... + d2020*c1009 + d2019*c1009 + d2018*c1008 + d2017*c1008 t=254 ...

Acc14,126 = Acc14,125 + d2045*c1015 + d2044*c1015 + d2043*c1014 + d2042*c1014 + ... +d2033*c1009 + d2032*c1009 + d2031*c1008 + d2030*c1008

Acc15,126 = Acc15,125 + d2046*c1015 + d2045*c1015 + d2044*c1014 + d2043*c1014 + ... + d2034*c1009 + d2033*c1009 + d2032*c1008 + d2031*c1008

| IReg1 | | ... | | | IReg0 | | | |
|---|---|---|---|---|---|---|---|---|
| d2063 | d2062 | d2061 | ... | d2050 | d2049 | d2048 | d2047 | d2046 | d2045 | ... | d2034 | d2033 | d2032 |

Acc0,127 = Acc0,126 + d2047*x + d2046*x + d2045*c1022 + d2044*c1022 + ... + d2035*c1017 + d2034*c1017 + d2033*c1016 + d2032*c1016

Acc1,127 = Acc1,126 + d2048*x + d2047*x + d2046*c1022 + d2045*c1022 + ... + d2036*c1017 + d2035*c1017 + d2034*c1016 + d2033*c1016 t=255 ...

Acc14,127 = Acc14,126 + d2061*x + d2060*x + d2059*c1022 + d2058*c1022 + ... + d2049*c1017 + d2048*c1017 + d2047*c1016 + d2046*c1016

Acc15,127 = Acc15,126 + d2062*x + d2061*x + d2060*c1022 + d2059*c1022 + ... + d2050*c1017 + d2049*c1017 + d2048*c1016 + d2047*c1016

FIG. 8(b)

APPARATUS AND METHOD FOR ACQUIRING SPREAD-SPECTRUM SIGNALS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an apparatus and method for acquiring spread-spectrum signals, and more particularly, to an apparatus and method for acquiring a very weak spread-spectrum signal in real-time.

BACKGROUND OF THE INVENTION

The global positioning system is a satellite based navigation system having a network of 24 satellites orbiting the earth 11,000 nautical miles in space, in six evenly distributed orbits. Each satellite orbits the earth every twelve hours, and transmits spread-spectrum signals with it's own individual pseudorandom (PN) code. By transmitting several signals over the same spectrum using distinctly different PN coding sequences, the satellites may share the same bandwidth without interfering with each other. The PN code used in the spread-spectrum signal of the GPS has a length of 1023 chips with the period of 1 msec.

A GPS receiver may, using the different PN sequences, search the signal spectrum to look for a match. If the GPS receiver finds a match, then it will identify the satellite that generated the signal. Most conventional GPS receivers use serial correlators to acquire, track and demodulate signals transmitted from GPS satellites. The signal available for civil use is a 50-bit data per second, BPSK-encoded spread-spectrum signal, having 1.023 Mchip/sec, modulated onto the carrier frequency of 1575.42 MHz.

When attempting to lock onto the GPS signal for position measurement, a GPS receiver must resolve the unknown carrier frequency and code phase uncertainty of the spread-spectrum signals. The unknown carrier frequency arises from the Doppler frequency shift due to relative motion of the satellite and the receiver, and the unknown difference between the GPS receiver's clock frequency and the satellite's frequency. The code phase uncertainty is due to the unknown difference between the GPS receiver's clock and the satellite's clock.

Conventional GPS receivers search for the GPS signal hidden in noise by methods of trial and error, of which the serial correlator generates a replica PN code signal of assumed carrier frequency and code phase, compares the locally generated signal against the received signal over one PN code period, and shifts the locally generated signal half-chip at a time, over 1023 chips, until it matches the received signal. Comparison of the two signals is done by the method of correlation. When a match occurs, the serial correlator outputs a large value. If no match occurs over 1023 chips, the carrier frequency is changed, and the code phase shifting and signal comparison are performed again, until a match is found. Since the GPS PN code period is 1 msec and there are 1023 possible code phases, it requires 1.023 sec to search through all code phases at a single frequency. There may be as many as 36 frequencies to search for each visible satellite on a consumer-grade GPS receiver. Even on a multi-channel GPS receiver, signal detection can be a very time consuming process, especially in low signal-to-noise ratio environment.

To detect an attenuated GPS signal, correlation longer than 1 msec needs to be performed for each frequency and code phase combination. It is well known that as the correlation interval is increased by a factor of N, the frequency step-size of the unknown carrier search needs to be scaled by a factor of 1/N, resulting in the overall search time increased to a factor of $N^2$. Consequently, the signal search time becomes unreasonably long when several milliseconds of correlation is used to detect an attenuated GPS signal.

Recently, new applications of GPS in cellular phones for E911 operation have emerged. They require GPS receivers to operate in difficult environments, such as indoors, and achieve rapid signal detection in matters of seconds. Detecting such highly attenuated signals requires signal correlation to be performed over a much longer period of time, beyond the 10 msec correlation period used for tracking in some conventional GPS receivers. Acquisition of signal using 10 msec of correlation slows the search process by a factor of 100, which is impractical for any use on a conventional GPS receiver.

Due to the 50 bps data modulation on the GPS signal, performance of correlation (or coherent integration) beyond 10 msec degrades. To detect GPS signals indoors, a longer accumulation of the GPS signal is needed to detect signals as weak as −150 dBm. A sequential correlator alone would take about 460 sec to search through all the code phases at a single frequency point. Even on a 16-channel 64-correlator GPS receiver design, the total acquisition time for such kind of weak signal becomes too long to serve any practical purpose.

The overall GPS signal search time is inversely proportional to the number of correlators being used. Thus GPS designers used the technique of time-sharing of common circuits at a higher clock rate, to achieve many-more equivalent-number of correlators, without actually increasing the correlator hardware proportionally. U.S. Pat. No. 5,897,605 issued on Apr. 27, 1999, describes a spread-spectrum receiver with fast signal acquisition that permits realization of a 240 correlator design using a time-shared common circuitry; it has a speed advantage of 5-fold over the conventional 12-channel 48-correlator design. Such speed is still not enough for detection of weak GPS signals in an acceptable time. U.S. Pat. No. 6,606,346 issued on Aug. 12, 2003, describes a method for correlation of GPS signals at high speed, making it possible to realize a high-sensitivity GPS receiver with reasonable signal detection time. This design requires a high clock rate, on the order of 100 MHz or higher, to realize one complete generation of 2046 half-chip-spaced correlation result within 1 msec time of one PN code period. Higher clock rate directly implies more power consumption required; which makes it less suitable for battery-supplied portable designs.

Thus there is a need for a hardware architecture that significantly accelerates signal acquisition speed, achieve high-sensitivity, and runs at a low clock rate for low-power operation on a portable device.

BRIEF SUMMARY OF THE INVENTION

The objective of the present invention is to provide an apparatus and method for acquiring a very weak spread-spectrum signals in real-time.

In order to achieve the above-mentioned objective, and avoid the problems of the prior art, the present apparatus for acquiring spread-spectrum signals comprises a mixer for generating an in-phase signal and a quadrature signal from the spread-spectrum signal, a decimator connected to the mixer for subsampling the in-phase signal and the quadrature signal, a correlation engine connected to the decimator for producing an in-phase correlation between the subsampled in-phase signal and a PN code and producing a quadrature correlation between the subsampled quadrature signal and the PN code, a first coherent integrator connected to the correlation engine for accumulating a plurality of in-phase correlations to produce an in-phase coherent integration, a second coherent integrator connected to the correlation engine for accumulating a plurality of quadrature correlations to produce a quadrature coherent integration, an incoherent integrator connected to the first coherent integrator and the second coherent integrator for accumulating the in-phase coherent integrations and the quadrature coherent integrations to produce an incoherent integration, and a signal detector connected to the incoherent integrator for checking the presence of the spread-spectrum signal based on the incoherent integration.

The method for acquiring spread-spectrum signals first generates an in-phase signal and a quadrature signal from the spread-spectrum signal. The in-phase signal is multiplied with a PN code to produce an in-phase correlation and the quadrature signal is multiplied with the PN code to produce a quadrature correlation. A plurality of in-phase correlations are accumulated to produce an in-phase coherent integration and a plurality of quadrature correlations are accumulated to produce a quadrature coherent integration. An incoherent integration is produced by accumulating a plurality of in-phase coherent integrations and quadrature coherent integrations, and the presence of the spread-spectrum signal is checked based on the incoherent integration.

BRIEF DESCRIPTION OF THE SEVERAL VIEWS OF THE DRAWINGS

Other objectives and advantages of the present invention will become apparent upon reading the following descriptions and upon reference to the accompanying drawings.

FIG. 6 is a chart showing the content arrangement for the PN Code Look-Up-Table ROM.

FIG. 7 is another chart showing how the content of the RAM buffer evolves over time.

FIG. 8(a) and FIG. 8(b) show are flow diagrams showing how the correlation is calculated by the ParCor modules according to the present invention.

DETAILED DESCRIPTION OF THE INVENTION

The process of position measurement in a GPS receiver involves a two-dimensional search of finding the exact code phase of the incoming PN code and carrier frequency residual of the signal. A GPS receiver steps through each possible frequency and checks each possible code phase by correlating the incoming carrier de-rotated signal with a self-generated PN code (also referred to as C/A code) phase delayed in half-chip increments, for a duration of one PN code period of one millisecond. If the value of the correlation result is larger than a programmed threshold, the signal is detected and the amount of delay introduced in the PN code corresponds to the arrival time of the GPS signal. If the value of the correlation result is smaller than the threshold, no signal is detected, and the search continues with another frequency and code phase combination. The present invention will be described in detail below as being applied to the GPS, and one skilled in the art shall appreciate that the application of the present invention is not limited to the GPS system.

Figure 1:
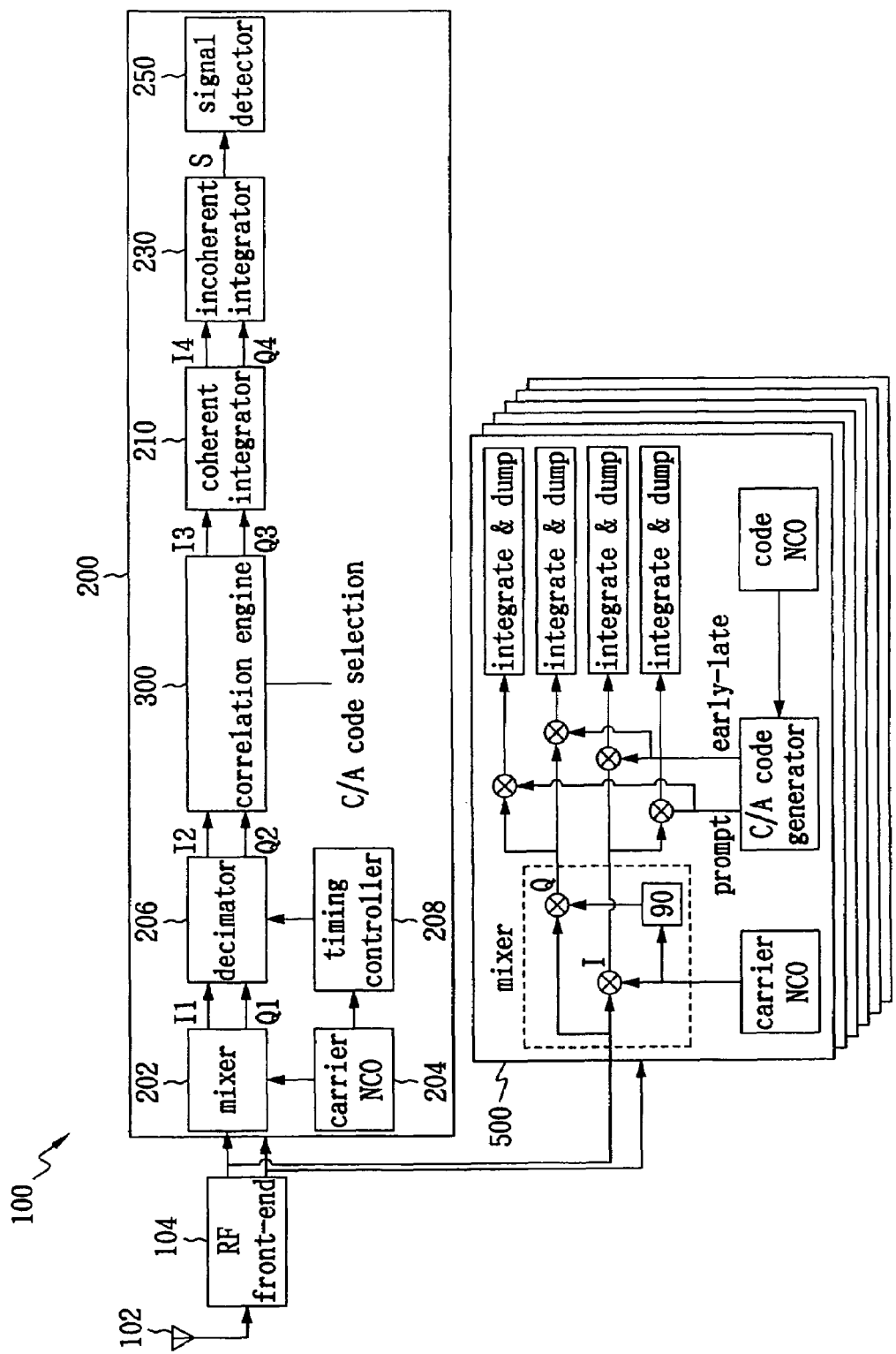
FIG. 1 is a functional block diagram of a GPS receiver incorporating one embodiment of the present invention

FIG. 1 is a functional block diagram of a GPS receiver 100 incorporating one embodiment of the present invention. The GPS receiver 100 comprises an antenna 102 for receiving the GPS signal, an RF front-end 104 for filtering, amplifying, down-converting the GPS signal to a lower intermediate frequency (IF), an acquisition apparatus 200 for acquiring the GPS signal and a plurality of tracking modules 500 for tracking the GPS signal. The digitized IF output from the RF front-end 104 may be 1 to 4 bits per sample; 1 bit output is used in paragraphs below for illustration purposes.

The acquisition apparatus 200 includes a mixer 202 connected to the RF front-end 104, a decimator 206 connected to the mixer 202, a correlation engine 300 connected to the decimator 206, a coherent integrator 210 connected to the correlation engine 300, an incoherent integrator 230 connected to the coherent integrator 210 and a signal detector 250 connected to the incoherent integrator 230.

The mixer 202 is driven by a numerically controlled oscillator (NCO) 204 to generate a base-band signal consisting of an in-phase component I1 and a quadrature component Q1, wherein I1 and Q1 have a nominal data rate of 8 samples/chip, respectively. When the frequency of the NCO 204 is properly set, the residual frequency error after down-conversion by the RF front-end 104, the frequency error of the reference clock, and Doppler frequency shift due to the relative motion of the satellite and the receiver are removed. The frequency uncertainty of the signal is said to be resolved under such case.

The decimator 206 is driven by the NCO 204 through a timing controller 208 to generate an in-phase signal I2 and a quadrature signal Q2, and I2 and Q2 have a lower data rate than I1 and Q1. For example, I1 and Q1 have a nominal data rate of 8 samples/chip, while the data rate of I2 and Q2 can be 2 (or 4) samples/chip. In addition, the decimator 206 also takes Doppler shift compensation into consideration.

Figure 2:
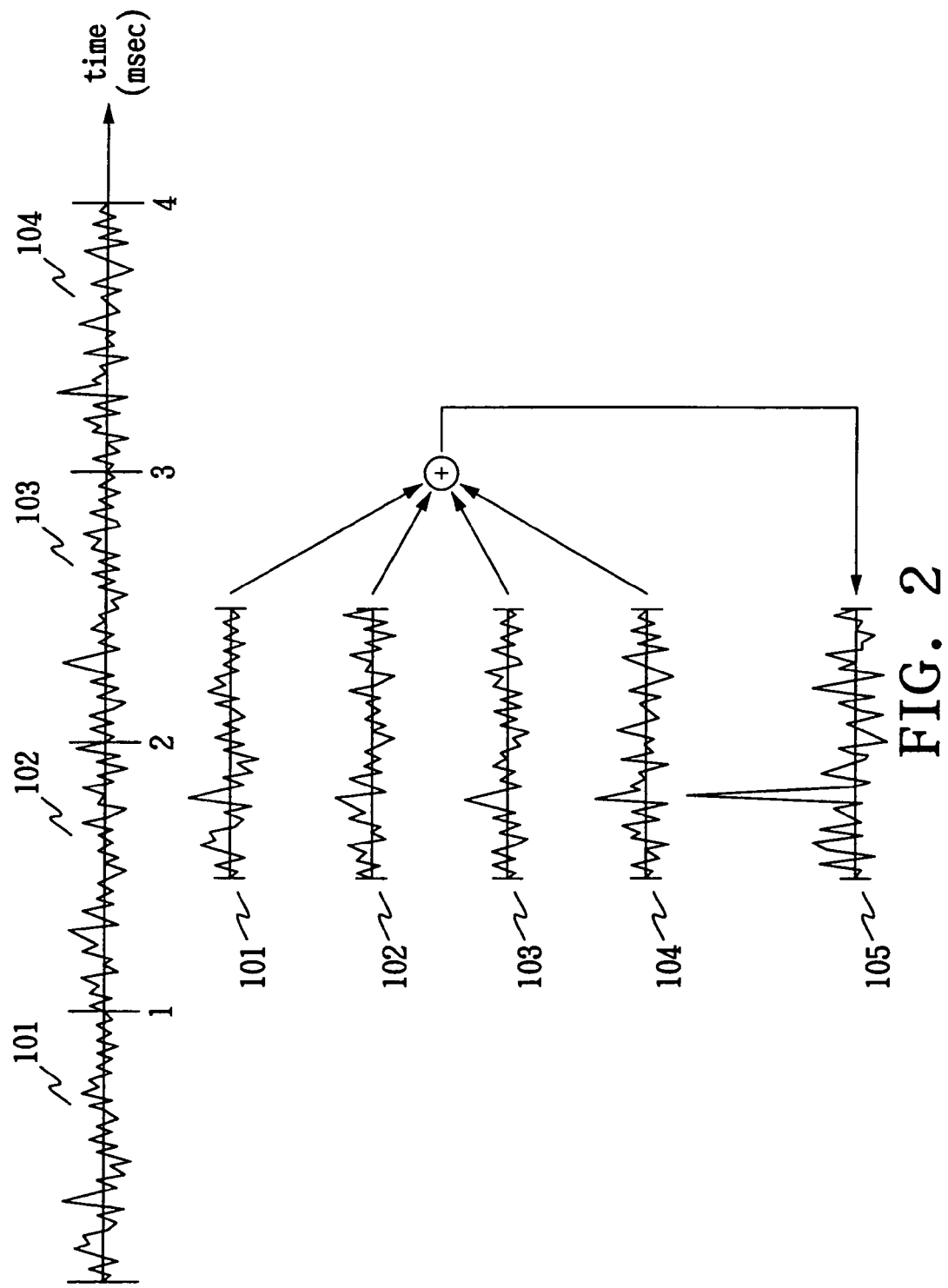
FIG. 2 is a graphic illustration showing how the coherent integration improves the signal-to-noise ratio

The correlation engine 300 performs the high-speed correlation of I2, Q2 with a selected PN code to generate I3 and Q3 with a complete 2046-points (or 4092-points for 4 samples/chip) correlation result for every PN code period of 1 millisecond. Since the GPS PN code has a nominal period of 1 msec, consecutive 1 msec correlation output frames from the correlation engine 300 will have similar characteristics. Accumulating the 1 msec outputs frame-by-frame and adding together at the same relative offset from the start of the frame will improve the signal-to-noise ratio, as shown in FIG. 2. Four frames 101, 102, 103 and 104 are added to produce a coherent integrated frame 105. Obviously, the frame 105 has an improved signal-to-noise ratio to increase the chance of detecting weak GPS signals. This processing is referred to as coherent integration performed by the coherent integrator 210, which generates one frame of output data, 2046 points on I4 and Q4 respectively, every time a programmed number of 1 msec frames are integrated.

The duration over which the coherent integration can be performed in GPS signal processing is limited by the GPS data bit modulation, and the residual carrier offset variation due to the Doppler shift of the signal, and stability of the frequency reference. With 50 bps data BPSK-modulated onto the GPS signal, consecutive PN code frames could change sign beyond 20 msec. With unknown data bits used in signal modulation, the coherent integration is limited to less than 20 msec. Usually, 10 msec or less is used and 10 msec of coherent integration will provide 10 dB of processing gain.

To increase the processing gain further to detect a weaker signal, the I4 and Q4 output from the coherent integrator 210 are squared and summed in the incoherent integrator 230. Squaring and summing removes the rotating effect of the residual carrier offset and the 50 bps data modulation on I4 and Q4, allowing much longer integration to be applied to further increase receiver sensitivity. Such incoherent integration can be performed over several seconds. The incoherent integrator 230 generates one frame of data, 2046 points every time a programmed number of coherent integration output frames are incoherently integrated.

Output from the incoherent integrator 230 is sent to the signal detector 250 to check for presence of the GPS signal. If no signal is detected after coherent and incoherent processing of a pre-determined integration period, a different carrier NCO frequency is tried. When the signal is detected, the PN code phase information is derived from the location of the correlation peak in the incoherent integrator output. The code phase information, along with the carrier offset information, is transferred to one of the unused tracking modules 500. The tracking modules 500 are substantially similar to those used in a conventional GPS receiver. Under a closed-loop mode, the carrier tracking loop and code tracking loop within the tracking modules 500 will pull-in and track the detected weak GPS signal from the acquisition apparatus 200. The search process is repeated for all visible satellites. After at least four (4) satellites are tracked by the tracking-modules 500, GPS measurement can be taken and a navigation solution could be computed.

Since N-millisecond of coherent integration processing to increase sensitivity incurs the penalty of slowing down the overall search speed to $1/N^2$ on a given receiver architecture, a 10 msec coherent integration processing would result in a search speed 100 times slower, which is unacceptable on a conventional GPS receiver. The present invention discloses a very high-speed search engine, of low implementation cost and complexity, such that even when 10 msec coherent integration and long incoherent integration is used, the overall processing time is still quite reasonable.

Figure 3:
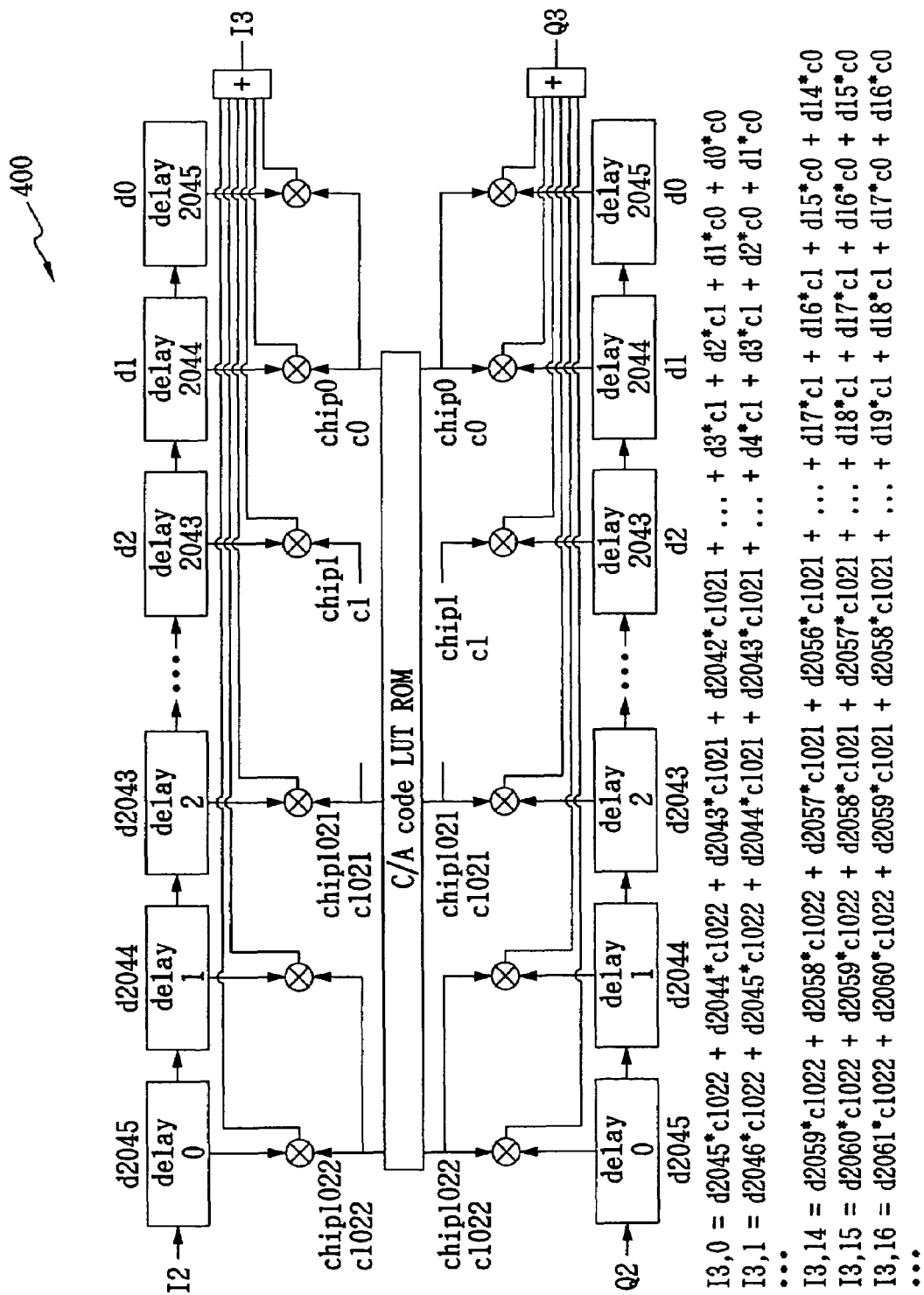
FIG. 3 shows a functional block diagram of an intuitive, direct match-filter-type implementation for a correlation engine.

FIG. 3 illustrates the architecture of an intuitive, direct implementation of the matched-filter-based correlation engine 400, having ½-chip resolution or half-chip delays. There are a total of 2046 taps to accommodate the 2046 half-chip outputs from the decimator 206. As each sample is shifted into the 2046-tap delay line, one point of correlation result is computed by vector multiplying the input samples with the PN code from the PN code Look-Up-Table (LUT) ROM and summing the results. At a nominal input data rate of 2.046E6 samples/sec, a complete 2046 point half-chip-spaced correlation result is generated every millisecond in the I3 and Q3 outputs, respectively. A conventional 12-channel, 48 serial-correlator design generates 24 half-chip-spaced correlation points every millisecond. Thus such matched-filter-based correlation engine operates at 85 times the speed of the conventional 12-channel 48-correlator design. The equations, at bottom of FIG. 3, show how the I-channel output is computed for the first 17-point correlation results as data is shifted into the delay line. However, such straightforward implementation requires a very large number of flip-flops for the shift delay line and a very large multiply-add structure.

Figure 4:
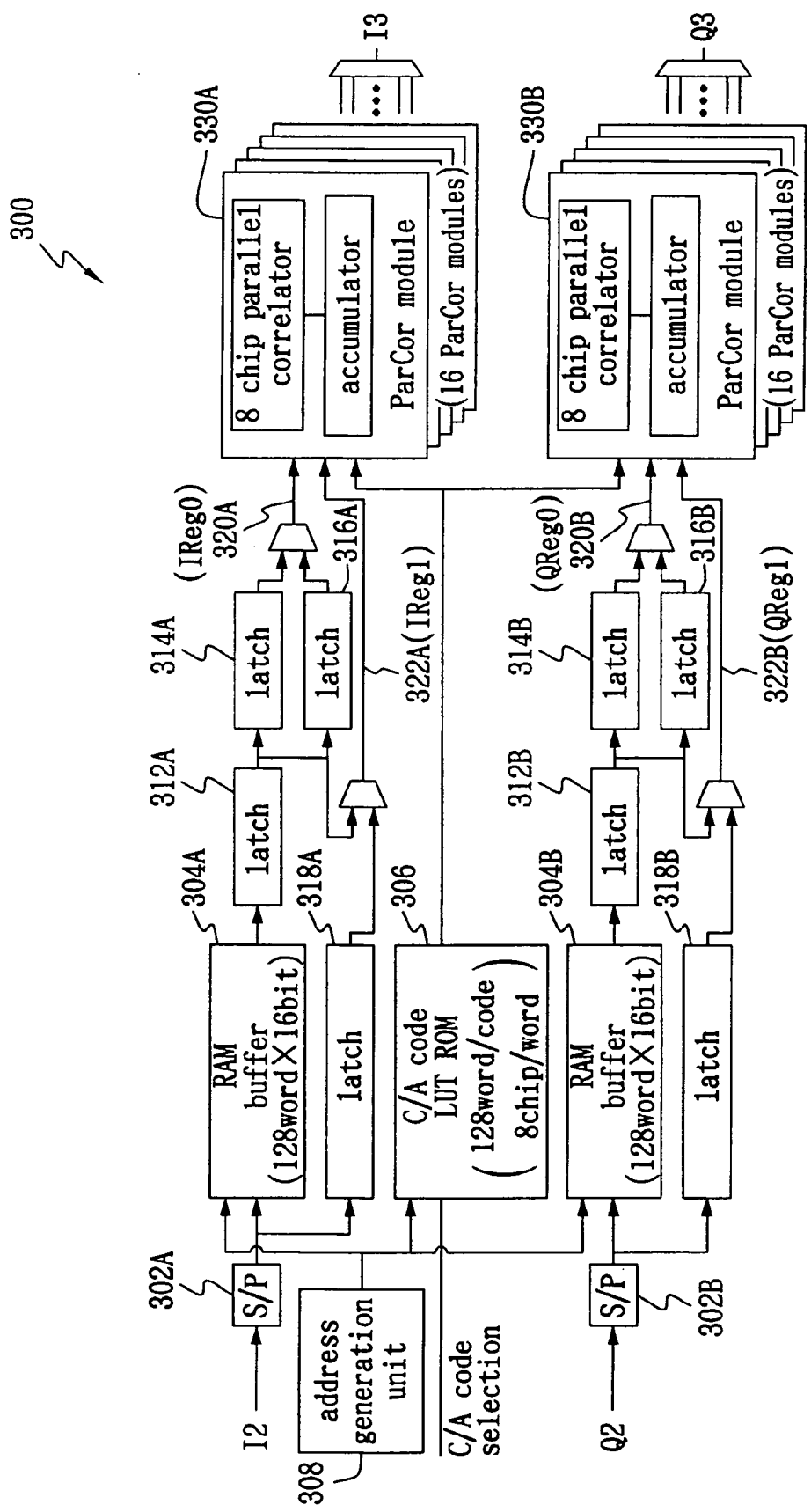
FIG. 4 is a schematic view showing the architecture of the correlation engine according to the first embodiment of the present invention.

FIG. 4 illustrates the architecture of the correlation engine 300 according to the present invention. As show in FIG. 4, the correlation engine 300 comprises serial-to-parallel (S/P) converters 302A, 302B connected to the decimator 206 for grouping a plurality of samples into a word, RAM buffers 304A, 304B with a data width capable of storing the word, a plurality of partial correlation (ParCor) modules 330 for calculating a partial correlation between the word and a PN code segment, and an PN code LUT ROM 306 for storing the PN codes.

I2 and Q2 with 2.046E6-samples/sec (2 Fo) from the decimator 206 are grouped into 16-bit words by the S/P converters 302A, 302B, respectively, with data rate lowered to Fo/8, or one output every 8-chip period. The 16-bit words are to be written to the 128 word-by-16-bit RAM buffers 304A, 304B (or a single 128 word-by-32-bit RAM buffer), which serves the purpose of the sample delay line in FIG. 3. An address generation unit (AGU) 308 generates address pointers for the RAM buffers 304A, 304B and the LUT ROM 306. With a system clock running at 16.368 MHz, or 16 Fo, there are nominally 128 clocks between every 16-bit word from the S/P converter 302A, 302B. 16 points of half-chip-spaced correlation result are computed across 16 ParCor modules 330A using nominally 128 clocks, for every 16-bit word transferred into the RAM buffer 304A from the S/P converter 302A. The computation output rate matches the input data rate, equivalently generating one correlation result for every input, and full 2046-points correlation result is generated every millisecond in real-time for I and Q channels, respectively.

Figure 5:
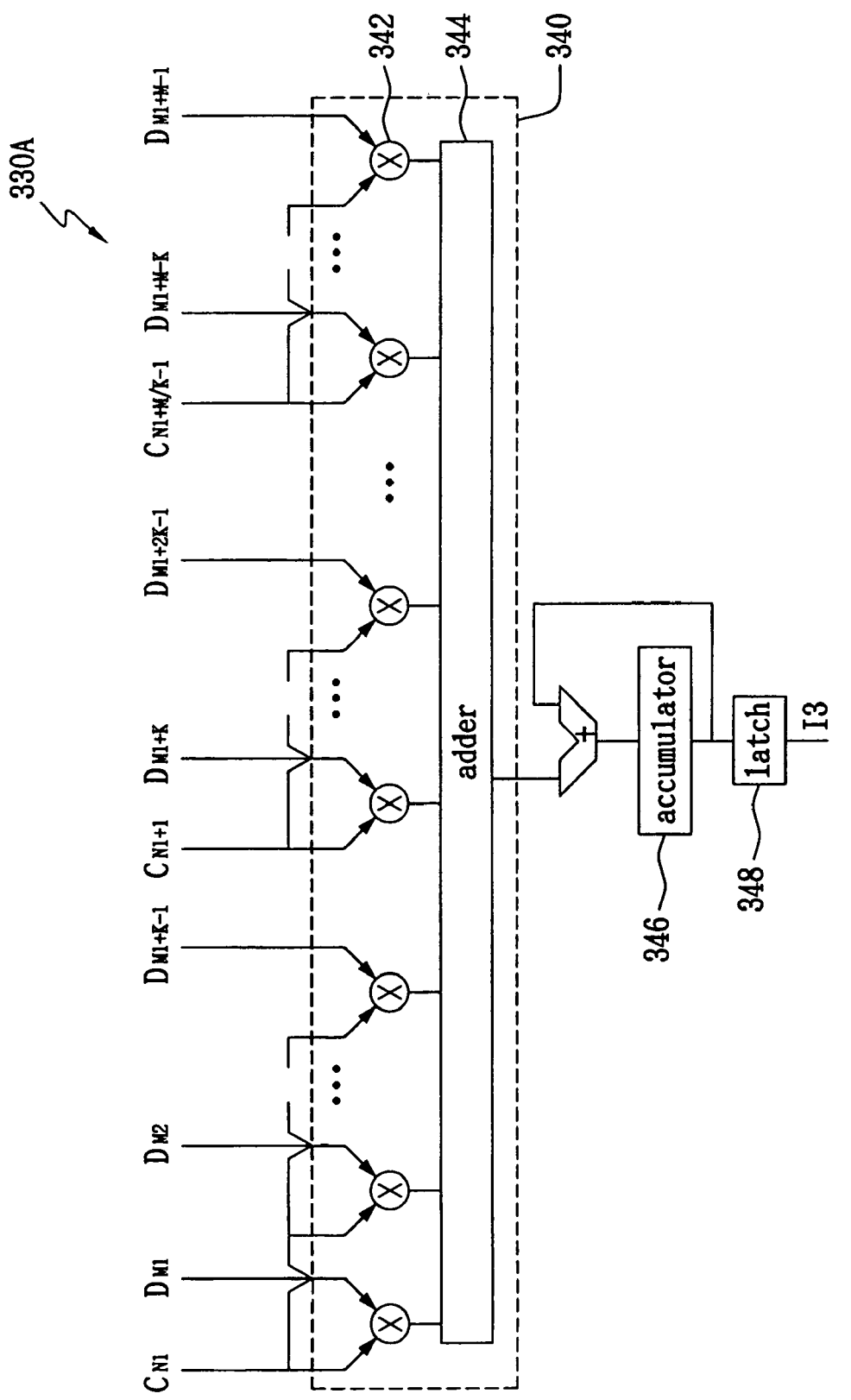
FIG. 5 is another schematic view showing the architecture of the partial correlation module according to the present invention.

FIG. 5 illustrates the architecture of the ParCor module 330A according to the present invention. As shown in FIG. 5, the ParCor module 330A comprises a correlator 340, an accumulator 346 and a latch 348. The correlator 340 substantially consists of 16 multipliers 342 and an adder 344 connected to the multipliers 342. Each multiplier 342 calculates the product between one sample of the 16-bit word and a corresponding chip of the PN code segment of 16 half chips, and the adder 344 connected to the 16 multipliers 342 sums up the 16 products calculated by the 16 multiplier 342 to produce a partial correlation. The accumulator 346 is substantially connected to the adder 344 and accumulates 128 partial correlations generated by the correlator 340 to produce a complete correlation, and the latch 348 then holds the final correlation result to the coherent integrator 210. Latch 348 holds the correlation result for the coherent integrator 210.

The following describes how 16 points of half-chip correlation result are generated in 128 clocks, or in 8-chip period, for I channel. Content of the LUT ROM 306 is shown in FIG. 6. Although not shown in the figure, the PN code for satellite-based augmentation systems such as WAAS, EGNOS, etc., can also be added to the LUT ROM 306 accordingly. Content of the RAM 304A over time is shown in FIG. 7. The content of the RAM buffer 304A is read out sequentially, one word per clock, into the latch 312A, with content of the latch 312A shifted into the latch 314A simultaneously. Content of the LUT ROM 306 is also read out sequentially on each clock, 8-chips per word at a time. 16 points of correlation result is computed across 16 ParCor modules 330A. On each clock, each ParCor module 330A computes a 16-point inner product of the 16-point samples, formed from an IReg0 320A and an IReg1 322A, and the doubly expanded 8-chips read out from the LUT ROM 306.

FIG. 8(*a*) and FIG. 8(*b*) show how the correlation is calculated by the ParCor modules 330A according to the present invention. Each partial correlation is calculated from a total of 32-point samples formed by IReg0 320A and IReg1 322A, and the LUT 306 output for each of the ParCor module 330A. Partial correlation results computed by the 16 ParCor modules 330A are also shown for time-step 128 through time-step 255. It is seen that at the end of the 128th clock, t is equal to 255, and the 16 correlation results accumulated in the ParCor modules 330A are almost identical to the results shown at the bottom of FIG. 3, differing only by the last two extra half-chip contributions. Such difference is quite negligible. Thus, the preferred embodiment approximates the exact correlation operation to a very high degree. It also runs at a very low system clock rate of 16.368 MHz.

Referring back to FIG. 4, when computing first of the 128 partial correlations, the content of IReg0 320A is selected from the latch 316A, which holds the value remembered from the last correlation computation. The content of IReg0 320A is selected from latch 314A during others of the 128 partial correlation computations. For the last of the 128 partial correlation, IReg1 322A is selected from the latch 318A, which holds the value from the last storage of the grouped 16-bit word into the RAM buffer 304A. Both the RAM buffer 304A and the latch 318A are updated with the newly grouped 16-bit word on the next clock. For others of the 128 partial correlations, IReg1 322A is selected from latch 312A. Compared with the matched-filter-based correlation engine 400 shown in FIG. 3, the correlation engine 300 of the present invention requires much less gate-count, and is more area efficient.

Figure 9:
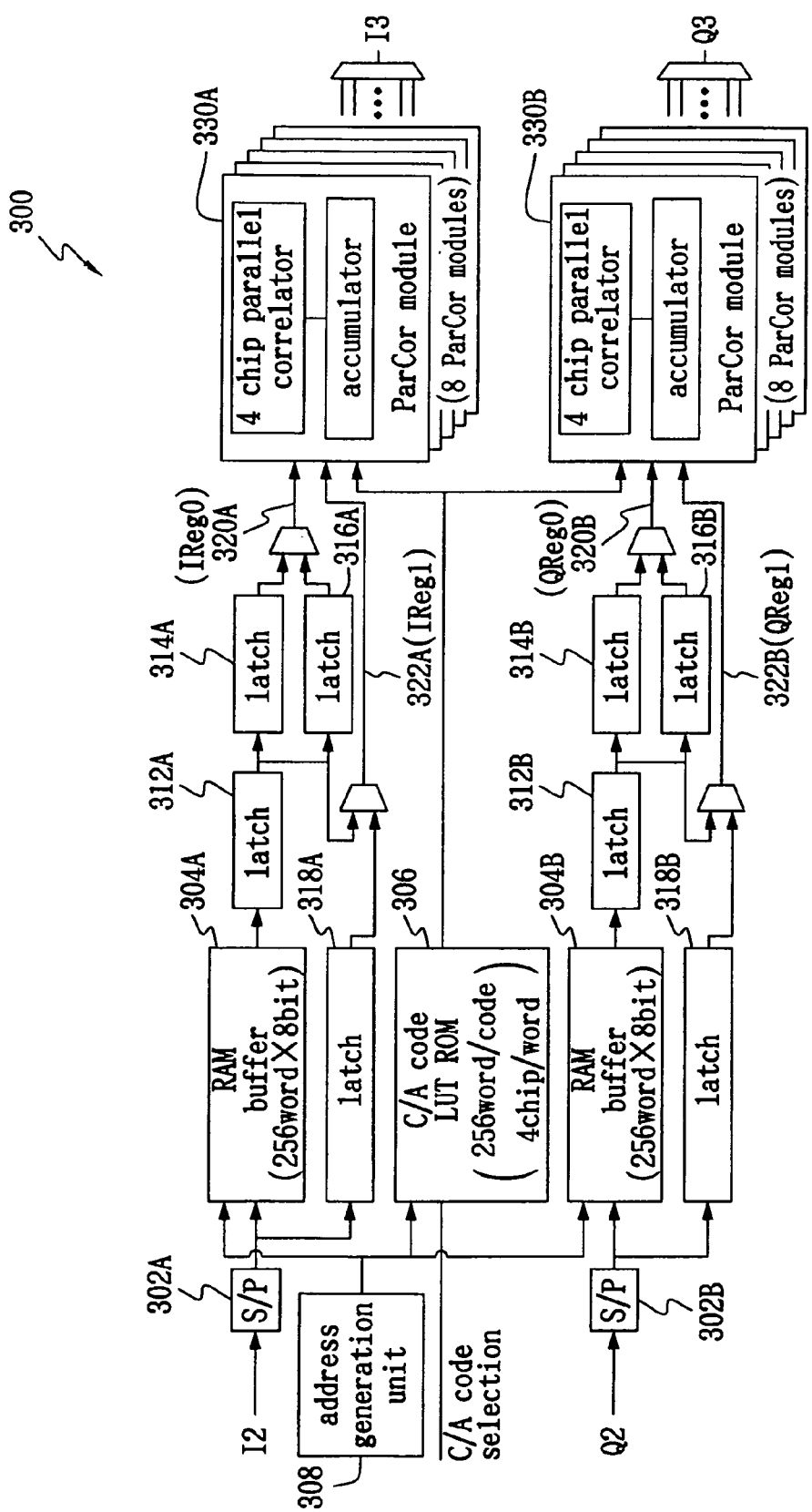
FIG. 9 is a schematic view showing the architecture of the correlation engine according to the second embodiment of the present invention.

To further reduce gate-count, the clock of the correlation engine 300 can be increased to 65.472 MHz (64 Fo), as shown in FIG. 9. The RAM buffers 304A and 304B are changed to be 256 word-by-8 bit and 8 ParCor modules 330A are used in the correlation engine 300 for calculating the partial correlation. The 2.046E6 samples/sec (2 Fo) 1-bit/sample output, I2 and Q2, from the decimator 206 are grouped into 8-bit words by the S/P converter 302A, 302B, with data rate lowered to Fo/4, or one output every 4-chip period. The 8-bit words are to be written to the 256 word-by-8 bit RAM buffers 304A. With the correlation engine 300 clocked at 64 Fo, there are nominally 256 clocks between every 8-bit word from the output of the serial-to-parallel converter. The preferred embodiment computes 8 points of half-chip-spaced correlation result, across 8 ParCor modules 330A using nominally 256 clocks, for every 8-bit word transferred into the RAM buffer 304A from the S/P converter 302A.

Figure 10:
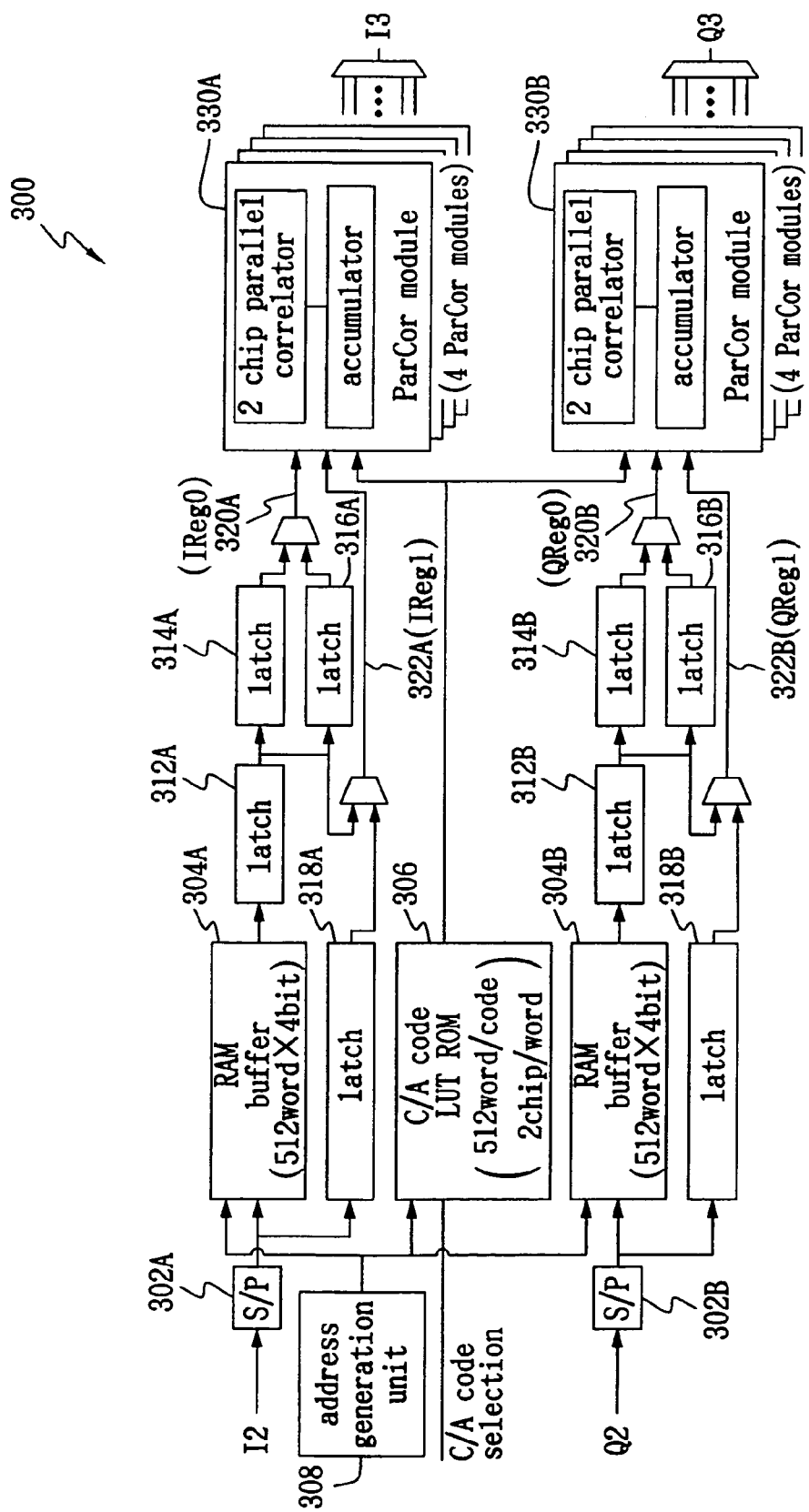
FIG. 10 is another schematic view showing the architecture of the correlation engine according to the third embodiment of the present invention.

FIG. 10 illustrates the architecture of the correlation engine 300 according to the third embodiment of the present invention. The clock of the correlation engine 300 is 261.888 MHz (256 Fo), the RAM buffers 304A and 304B are changed to be 512 word-by-4 bit, and 4 ParCor modules 330A are used in the correlation engine 300 for calculating the partial correlation. The 2.046E6 samples/sec (2 Fo) 1-bit/sample output, I2 and Q2, from the decimator 206 are grouped into 4-bit words by the S/P converters 302A and 302B, with data rate lowered to Fo/2, or one output every 2-chip period. The 4-bit words are to be written to the 512 word-by-4 bit RAM buffers 304A. With the correlation engine 300 clocked at 256 Fo, there are nominally 512 clocks between every 4-bit word from the output of the serial-to-parallel converter. The preferred embodiment computes 4 points of half-chip-spaced correlation result, across 4 ParCor modules 330A using nominally 512 clocks, for every 4-bit word transferred into the RAM buffer 304A, 304B from the S/P converter 302A, 302B. Obviously, raising the clock speed 4-fold (16-fold), both the number of ParCor modules 330A required, and input data width needed for each ParCor module 330A, reduce to ½ to (¼) of the original. Overall, the reduction in gate-count is more than 50% (75%) for the ParCor modules 330A by increasing the clock speed of the correlation engine by 4-fold (16-fold).

Figure 11:
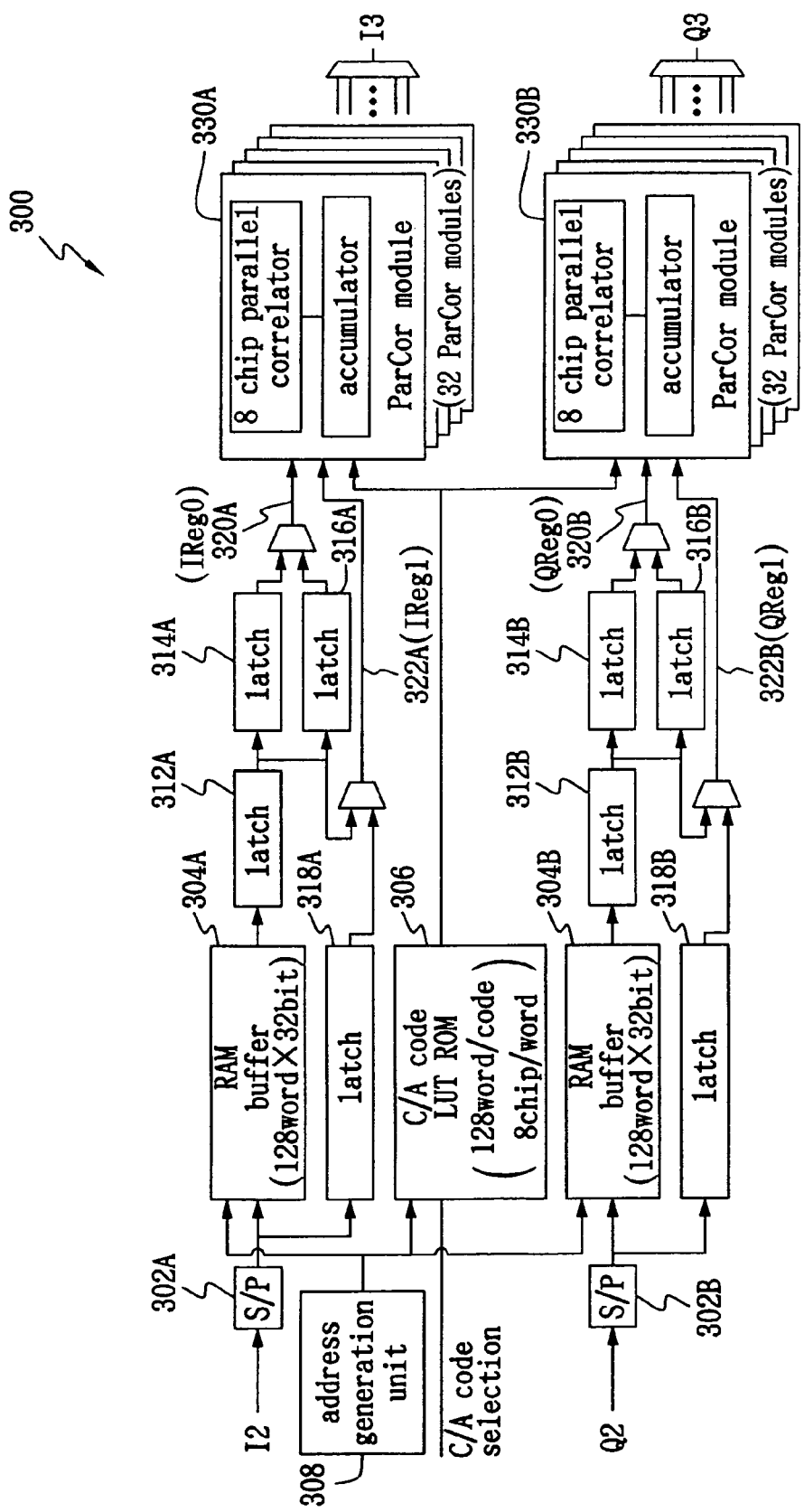
FIG. 11 is a schematic view showing the architecture of the correlation engine according to the fourth embodiment of the present invention.

FIG. 11 illustrates the architecture of the correlation engine 300 for processing ¼-chip-spaced samples (or 4 samples per chip period) according to the fourth embodiment of the present invention. Operation of the previously described embodiment is based on half-chip-spaced samples; here the decimator 206 of acquisition apparatus 200 (SEE FIG. 1) generates ¼-chip-spaced samples (or 4 samples per chip period) from I1 and Q1. The functions of the elements within the acquisition apparatus 200 are still the same as described previously, with width of the parallel-processing data-path and number of ParCor modules 330A, 330B doubled. Rest of the signal processing elements of the acquisition apparatus 200 would require 1 more bit to accommodate the doubling of the correlation result, due to change from integrating 2046 points per frame to integrating 4096 points per frame. The RAM buffers for coherent and incoherent integration would now require 4096 words of storage. The acquisition apparatus 200 still operates at a low clock rate of 16.368 MHz. The previously described technique of reducing the ParCor module gate-count by more than 50% (75%) using increased correlation engine clock speed of 4-fold (16-fold) still applies.

Figure 12:
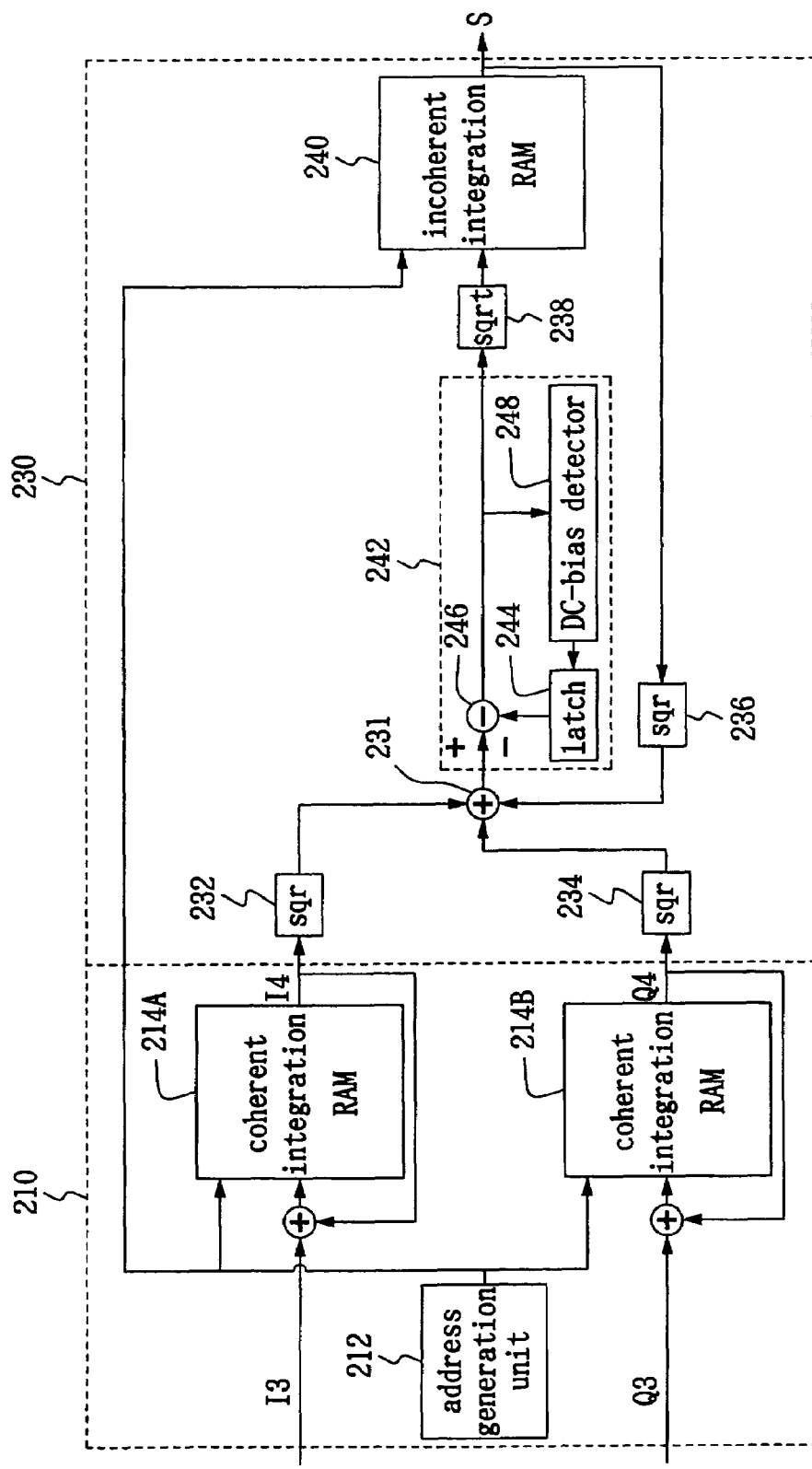
FIG. 12 is another schematic view showing the architecture of the coherent integrator and the incoherent integrator according to the present invention.

FIG. 12 illustrates the architecture of the coherent integrator 210 and the incoherent integrator 230 according to the present invention. The coherent integrator 210 includes an address generation unit 212 and two coherent integration RAM 214A, 214B. The data width of the coherent integration RAM 214A, 214B only needs to accommodate 1 to 10 milliseconds of coherent integration, and requires 2046 words of storage to accommodate the 2046 half-chip-spaced points of coherently added correlation results. The incoherent integrator 230 includes an incoherent integration RAM 240, a first squaring device 232 for squaring I4 from the coherent integration RAM 214A, a second squaring device 234 for squaring Q4 from the coherent integration RAM 214B, a third squaring device 236 for squaring a previous incoherent integration result stored in the incoherent integration RAM 240, an adder 231 for summing the outputs of the first, second and third squaring devices 232, 234,236 to generate a current incoherent integration squared value, and a square-root device 238 for reducing the number of bits required for the incoherent integration RAM 240 to store the incoherent integration result of sqrt($I^2+Q^2$). The square-root device 238 takes square root of the output of the adder 231 before storing to the incoherent integration RAM 240, and the retrieved result is squared by the third squaring device 236 first before adding to the new magnitude squared value. The address generation unit 212 generates address pointers for the coherent integration RAM 214A, 214B and incoherent integration RAM 240.

Figure 13:
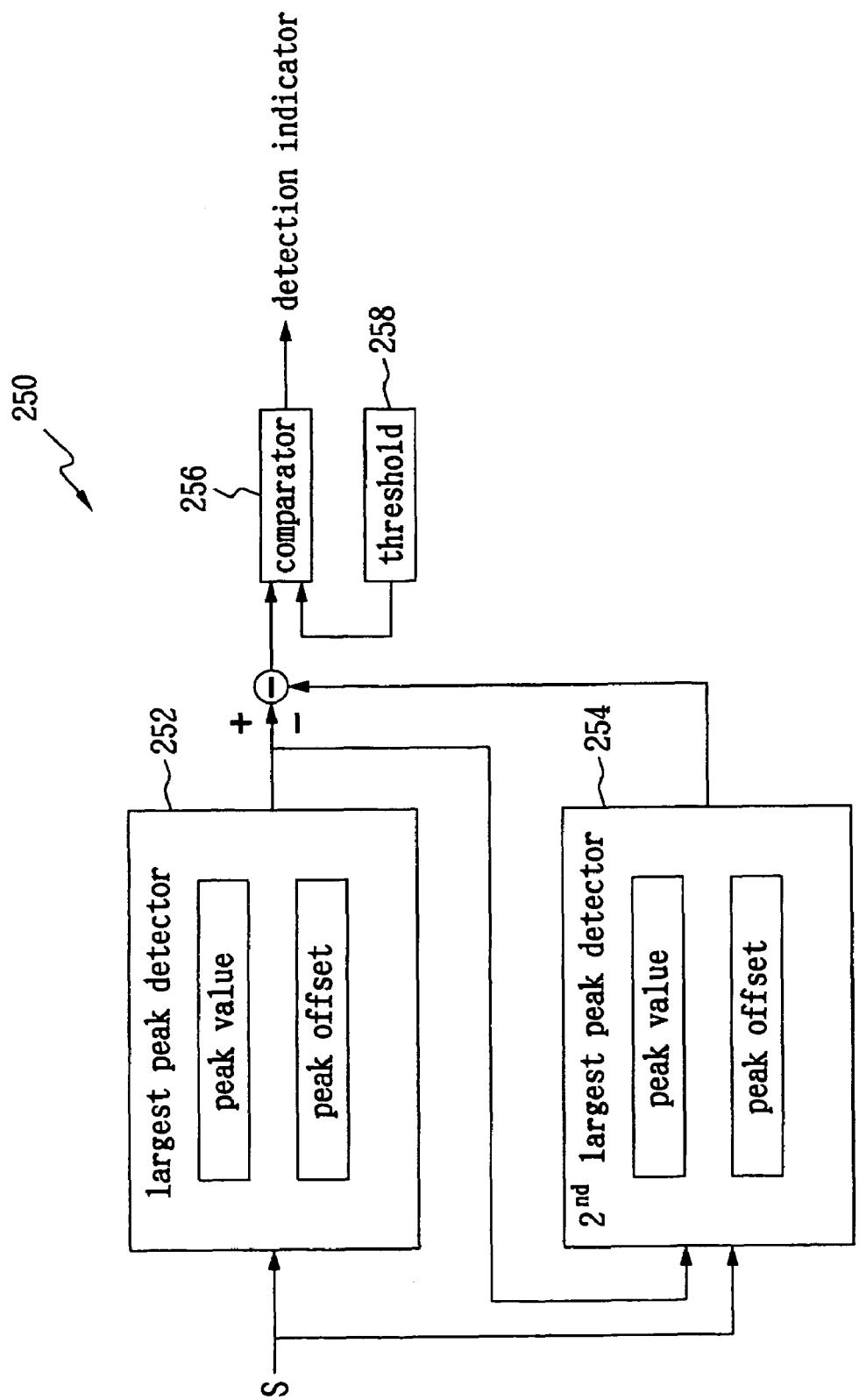
FIG. 13 is a block diagram illustrating the architecture of the signal detector according to the present invention.

FIG. 13 illustrates the architecture of the signal detector 250 according to the present invention. The signal detector 250 comprises a first set of registers 252 for storing a largest peak value and its corresponding off set location within the incoherent correlation result, a second set of registers 254 for storing a second largest peak value and its corresponding offset location within the incoherent correlation result, and a comparator 256 for comparing the difference between the largest peak value and the second largest peak value with a programmed threshold stored in a third register 258. After long-term incoherent integration, required to detect very weak GPS signals, there is significant DC level in the incoherently added correlation output. This DC level is related to the incoherent integration interval applied. Since it is very difficult to determine the absolute threshold values for all the possible input signal levels and the coherent and incoherent integration interval combinations, a much more simple signal detection scheme is needed. The present invention uses the difference of the two largest correlation peaks in the incoherent integration as the confidence level of signal presence. The comparator 256 compares the difference with a programmed threshold to check the presence of a spread-spectrum signal and outputs a detection indicator. If the difference is larger than the threshold, signal detection is declared, otherwise no signal presence is declared. A larger threshold value yields a higher confidence level when signal detection is declared.

Referring to FIG. 12, the incoherent integrator 230 further includes a DC-bias removal device 242 substantially consisting of a latch 244 for storing a minimal DC-bias of a previous incoherent integration, a subtracter 246 for subtracting the output of the adder 231 by the minimal DC-bias stored in the latch 244, a DC-bias detector 248 for detecting the minimal DC-bias of a current incoherent integration from the subtracter 246. If the signal-to-noise ratio need not be estimated after signal detection, removing the minimal DC-bias level from the incoherently integrated result can lengthen the applicable incoherent integration interval. During the first iteration of the incoherent integration, the latch 244 is set to 0 and the DC-bias detector 248 registers the minimal value of the 2046-point incoherently integrated results. At end of the interval, the DC-bias value in the DC-bias detector 248 is transferred to the latch 244. During the next incoherent integration iteration, the output from the adder 231 is subtracted by the minimal value stored in the latch 244 to remove the DC-bias from the previous iteration of incoherent integration. Effectively, a longer incoherent integration can be achieved using 2046-word RAM of smaller size.

Figure 14:
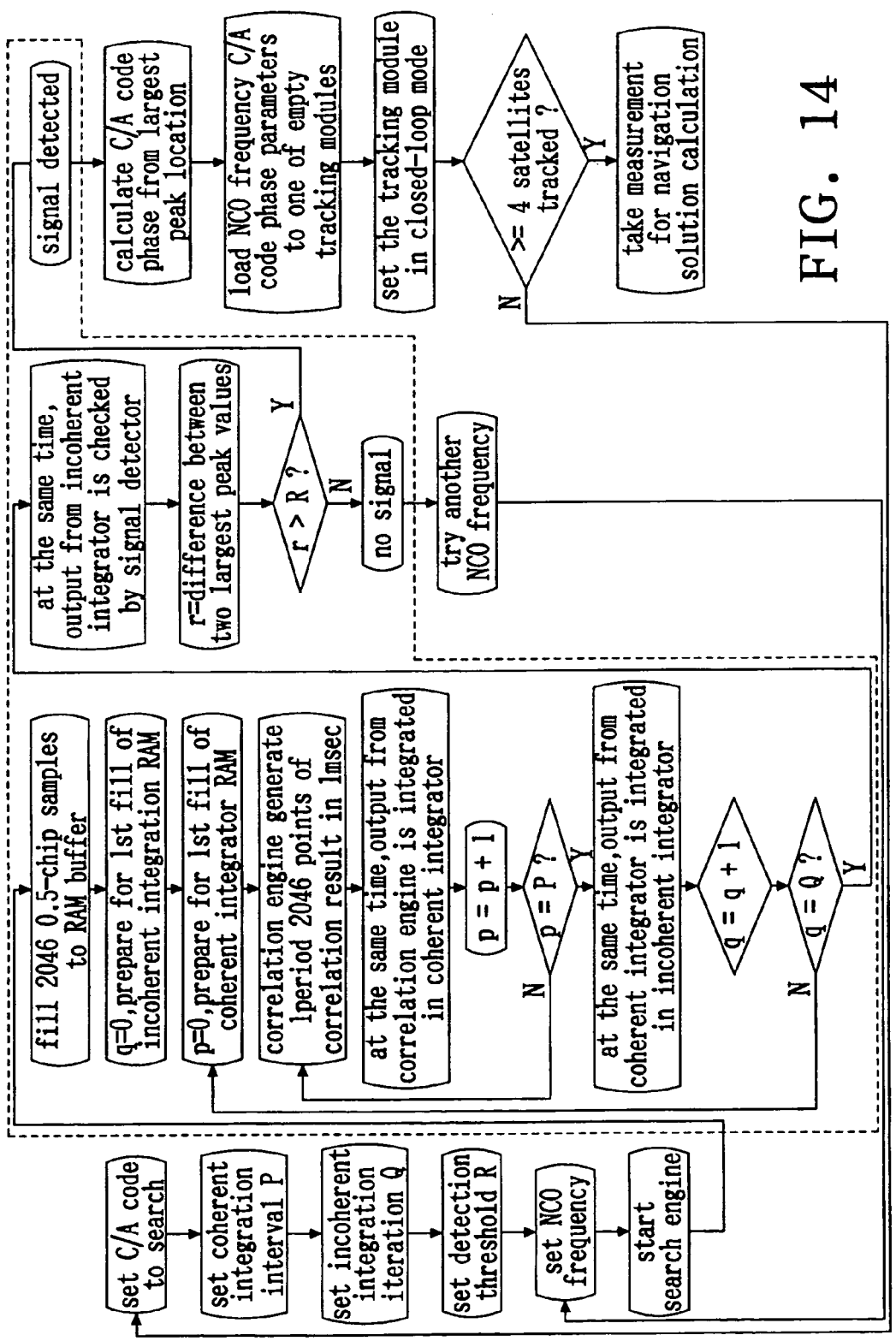
FIG. 14 is a flow chart showing the overall operation of the GPS receiver according to the present invention.

FIG. 14 is a flow chart showing the overall operation of the GPS receiver 100, wherein the acquisition apparatus 200 performs operations inside the area enclosed by the slash-dotted line and operations outside the area can be performed by software executed by a CPU. Under normal outdoor conditions, the GPS receiver 100 can demodulate the data bits within the spread-spectrum signal after the tracking modules 500 tracks the signals. After ephemeris data is collected, and time-of-week information is known, the position of the GPS receiver 100 can be calculated after measurements from four or more satellites are taken. For outdoor operation, high sensitivity is not a requirement; the GPS receiver 100 has the advantage of very high signal detection speed. For a weak signal environment, where data bits can no longer be correctly demodulated by the tracking modules 500, the GPS receiver 100 operates in an assisted-mode, where ephemeris data and time-of-week information are provided from outside, possibly from a wireless modem as in the case of an GPS-enable E911-capable handset.

In short, one embodiment of the present method for acquiring spread-spectrum signals of a global positioning system first generates an in-phase signal and a quadrature signal from the spread-spectrum signal. The in-phase signal and the quadrature signal are subsampled at a rate of 2 samples-per-chips, i.e., 2048 samples/msec. The 2046 samples for both the in-phase signal and the quadrature signal are grouped into 128 16-bit words and stored in the RAM buffer. The 16-bit word is then multiplied with a 16-bit PN code segment to produce an in-phase correlation. The quadrature signal is processed in the same manner. A plurality of in-phase correlations are accumulated to produce an in-phase coherent integration and a plurality of quadrature correlations are accumulated to produce a quadrature coherent integration. An incoherent integration is produced by accumulating a plurality of in-phase coherent integrations and quadrature coherent integrations, and the presence of the spread-spectrum signal is checked based on the incoherent integration.

Compared with the direct implementation of matched-filter-based correlation engine 400, the correlation engine 300 of the present invention possesses the advantages of smaller gate-count. In addition, the combination of coherent integration, incoherent integration, and signal detection scheme after matched filtering provides the processing necessary for operation in a very low signal-to-noise ratio environment.

The above-described embodiments of the present invention are intended to be illustrative only. Numerous alternative embodiments may be devised by those skilled in the art without departing from the scope of the following claims.

I claim:

1. An apparatus for acquiring spread-spectrum signals comprising:

a decimator means for generating a plurality of samples based on the spread-spectrum signal;

a serial-to-parallel converter means connected to the decimator means for grouping a plurality of samples into a word;

a first memory means with a data width for storing the word;

a correlation engine means having a plurality of partial correlation modules connected to the first memory, said correlation engine means for calculating a partial correlation between the word and a PN code segment, wherein the partial correlation module comprises:

a plurality of multipliers and an adder for calculating an inner product of the word and the PN code segment to produce the partial correlation; and an accumulator means for accumulating a plurality of partial correlations to produce a complete correlation;

a coherent integrator means connected to the correlation engine means for accumulating a plurality of complete correlations to generate a coherent integration;

an incoherent integrator means connected to the coherent integrator means for accumulating a plurality of coherent integrations to generate an incoherent integration; and a signal detector means connected to the incoherent integrator means for checking the presence of the spread-spectrum signal based on the incoherent integration, said incoherent integrator means comprises:

an incoherent memory means for storing the incoherent integration;

a first squaring means for squaring an in-phase component of the coherent integration;

a second squaring means for squaring a quadrature component of the coherent integration;

a third squaring means for squaring a previous incoherent integration;

an adding means for summing outputs of the first, second and third squaring means for generating a squared value; and a square-root means for taking a square-root of the squared value to generate the incoherent integration and for halving a number of bits required for storing the output from the adding means.

2. The apparatus for acquiring spread-spectrum signals of claim 1, wherein the signal detector means comprises:

a first registering means for storing a largest peak value of the incoherent integration and its corresponding offset within the incoherent integration, said first registering means having a first set of registers;

a second registering means for storing a second largest peak value of the incoherent integration and its corresponding offset within the incoherent integration, said second registering means having a second set of registers; and a comparing means for comparing the difference between the largest peak value and the second largest peak value with a programmed threshold to check the presence of the spread-spectrum signal.

3. The apparatus for acquiring spread-spectrum signals of claim 1, wherein the incoherent integrator means further comprises a DC-bias removal device, said DC-bias removal device comprising:

a second memory means for storing a minimal DC-bias of a previous incoherent integration;

a subtracting means subtracting an output of the adding means by the minimal DC-bias stored in the second memory means; and a DC-bias detecting means for detecting the minimal DC-bias of a current incoherent integration from the subtracting means.

4. The apparatus for acquiring spread-spectrum signals of claim 1, wherein the decimator means generates the samples at a rate of K samples-per-chip, the word consists of M samples, and the correlation engine means includes M partial correlation modules for calculating the partial correlation.

5. The apparatus for acquiring spread-spectrum signals of claim 4, wherein the K is $2^N$, M is multiple of K, and N and M are positive integer numbers.

6. An apparatus for acquiring spread-spectrum signals comprising:

a mixing means for generating an in-phase signal and a quadrature signal from the spread-spectrum signal;

a decimating means connected to the mixing means for subsampling the in-phase signal and the quadrature signal;

a correlation engine means connected to the decimating means for producing an in-phase correlation between the subsampled in-phase signal and a PN code, and a quadrature correlation between the subsampled quadrature signal and the PN code;

a first coherent integrating means connected to the correlation engine means for accumulating a plurality of in-phase correlations to produce an in-phase coherent integration;

a second coherent integrating means connected to the correlation engine means for accumulating a plurality of quadrature correlations to produce a quadrature coherent integration;

an incoherent integrating means connected to the first coherent integrating means and the second coherent integrating means for accumulating a plurality of in-phase coherent integrations and the quadrature coherent integrations to produce an incoherent integration; and a signal detecting means connected to the incoherent integrating means for checking the presence of the spread-spectrum signal based on the incoherent integration, said incoherent integrating means comprises:

an incoherent memory means for storing the incoherent integration;

a first squaring means for squaring the in-phase coherent integration;

a second squaring means for squaring the quadrature coherent integration;

a third squaring means for squaring a previous incoherent integration;

an adding means for summing outputs of the first, second and third squaring means to generate a squared value; and a square-root means for taking a square-root of the squared value to generate the incoherent integration and for halving a number of bits required for storage.

7. The apparatus for acquiring spread-spectrum signals of claim 6, wherein the signal detecting means comprises:

a first registering means for storing a largest peak value of the incoherent integration and its corresponding offset within the incoherent integration, said first registering means having a first set of registers;

a second registering means for storing a second largest peak value of the incoherent integration and its corresponding offset within the incoherent integration, said second registering means having a second set of registers; and a comparing means for comparing the difference between the largest peak value and the second largest peak value with a programmed threshold to check the presence of the spread-spectrum signal.

8. The apparatus for acquiring spread-spectrum signals of claim 6, wherein the incoherent integrating means further comprises a DC-bias removal device, said DC-bias removal device comprising:

a memory means for storing a minimal DC-bias of a previous incoherent integration;

a subtracting means for subtracting the output of the adding means by the minimal DC-bias stored in the memory means; and a DC-bias detecting means for detecting the minimal DC-bias of a current incoherent integration from the subtracting means.

9. The apparatus for acquiring spread-spectrum signals of claim 6, wherein the decimating means subsamples the in-phase signal and the quadrature signal at a rate of K samples-per-chip, the correlation engine means includes 2M partial correlation modules for calculating the partial correlation, and M is multiple of K.

10. The apparatus for acquiring spread-spectrum signals of claim 9, wherein the K is $2^N$, and N is a positive integer.

11. A method for acquiring spread-spectrum signals comprising the steps of:
   generating an in-phase signal and a quadrature signal from the spread-spectrum signal;
   multiplying the in-phase signal with a PN code to produce an in-phase correlation, and multiplying the quadrature signal with the PN code so as to produce a quadrature correlation;
   accumulating a plurality of in-phase correlations to produce an in-phase coherent integration and a plurality of quadrature correlations to produce a quadrature coherent integration;
   accumulating a plurality of in-phase coherent integrations and quadrature coherent integrations so as to produce an incoherent integration; and
   checking the presence of the spread-spectrum signal based on the incoherent integration, the incoherent integration is produced by the steps of:
   squaring the in-phase coherent integration to produce a first value;
   squaring the quadrature coherent integration to produce a second value;
   squaring a previous incoherent integration to produce a third value;
   summing the first, the second and third values to produce a fourth value; and
   taking square root of the fourth value to generate the incoherent integration.

12. The method for acquiring spread-spectrum signals of claim 11, further comprising the steps of:
   detecting a minimal DC-bias of a current incoherent integration; and
   subtracting the incoherent integration by the minimal DC-bias.

13. The method for acquiring spread-spectrum signals of claim 11, wherein the presence of the spread-spectrum signal is checked by the steps of:
   detecting a largest peak value of the incoherent integration;
   detecting a second largest peak value of the incoherent integration; and
   comparing the difference between the largest peak value and the second largest peak value with a programmed threshold to check the presence of the spread-spectrum signal.

14. The method for acquiring spread-spectrum signals of claim 11, wherein the in-phase correlation is produced by the steps of:
   subsampling the in-phase signal to generate a plurality of samples at a rate of K samples-per-chip;
   grouping M samples to form a word, wherein M is multiple of K and a positive integer number;
   calculating an inner product between the word and a selected PN code segment to produce a partial correlation; and
   summing a plurality of partial correlations to produce the in-phase correlation.

15. The method for acquiring spread-spectrum signals of claim 14, wherein K is $2^N$, and N is a positive integer.

16. The method for acquiring spread-spectrum signals of claim 14, wherein the inner product is calculated by the steps of:
   calculating a product between each sample of the word and a corresponding chip of the selected PN code segment; and
   summing up the M products of the word and the selected PN code segment to generate the inner product.

* * * * *